United States Patent
Elsner et al.

(12) 
(10) Patent No.: US 6,627,040 B1
(45) Date of Patent: Sep. 30, 2003

(54) DEVICE AND METHOD FOR REMOVING VOLATILE COMPONENTS FROM POLYMER SOLUTIONS

(75) Inventors: Thomas Elsner, Düsseldorf (DE); Jürgen Heuser, Krefeld (DE); Christian Kords, Krefeld (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/673,225

(22) PCT Filed: Apr. 8, 1999

(86) PCT No.: PCT/EP99/02398

§ 371 (c)(1),
(2), (4) Date: Oct. 13, 2000

(87) PCT Pub. No.: WO99/54017

PCT Pub. Date: Oct. 28, 1999

(30) Foreign Application Priority Data

Apr. 21, 1998 (DE) .......................................... 198 17 678

(51) Int. Cl.[7] .............................. B01D 3/06; C08F 6/10; F28F 13/08
(52) U.S. Cl. ....................... 159/47.1; 159/2.1; 159/26.1; 159/26.2; 159/28.6; 159/DIG. 10; 159/DIG. 15; 165/146; 165/147; 528/501

(58) Field of Search ................................... 159/47.1, 2.1, 159/28.6, DIG. 10, 26.2, 26.1, DIG. 15; 202/177; 203/88; 523/324; 528/501; 165/133, 115, 146, 147

(56) References Cited

U.S. PATENT DOCUMENTS

| | | | |
|---|---|---|---|
| 4,808,262 A | | 2/1989 | Aneja et al. ................ 159/47.1 |
| 5,024,728 A | * | 6/1991 | Morita et al. ............... 159/27.4 |
| 5,084,134 A | | 1/1992 | Mattiussi et al. .......... 159/47.1 |

FOREIGN PATENT DOCUMENTS

| | | |
|---|---|---|
| EP | 0 150 225 | 12/1987 |
| WO | 95/24252 | 9/1987 |

* cited by examiner

Primary Examiner—Virginia Manoharan
(74) Attorney, Agent, or Firm—Joseph C. Gil; James R. Franks; Aron Pres

(57) ABSTRACT

A device and process for the removal of volatile constituents from polymers is disclosed. The device entails a container having an inlet for a polymer solution, an outlet for the volatile components, an outflow for the polymer from which the volatile components have been removed and a heat exchanger. The heat exchanger is characterized in that it contains a plurality of specially structured channels.

25 Claims, 4 Drawing Sheets

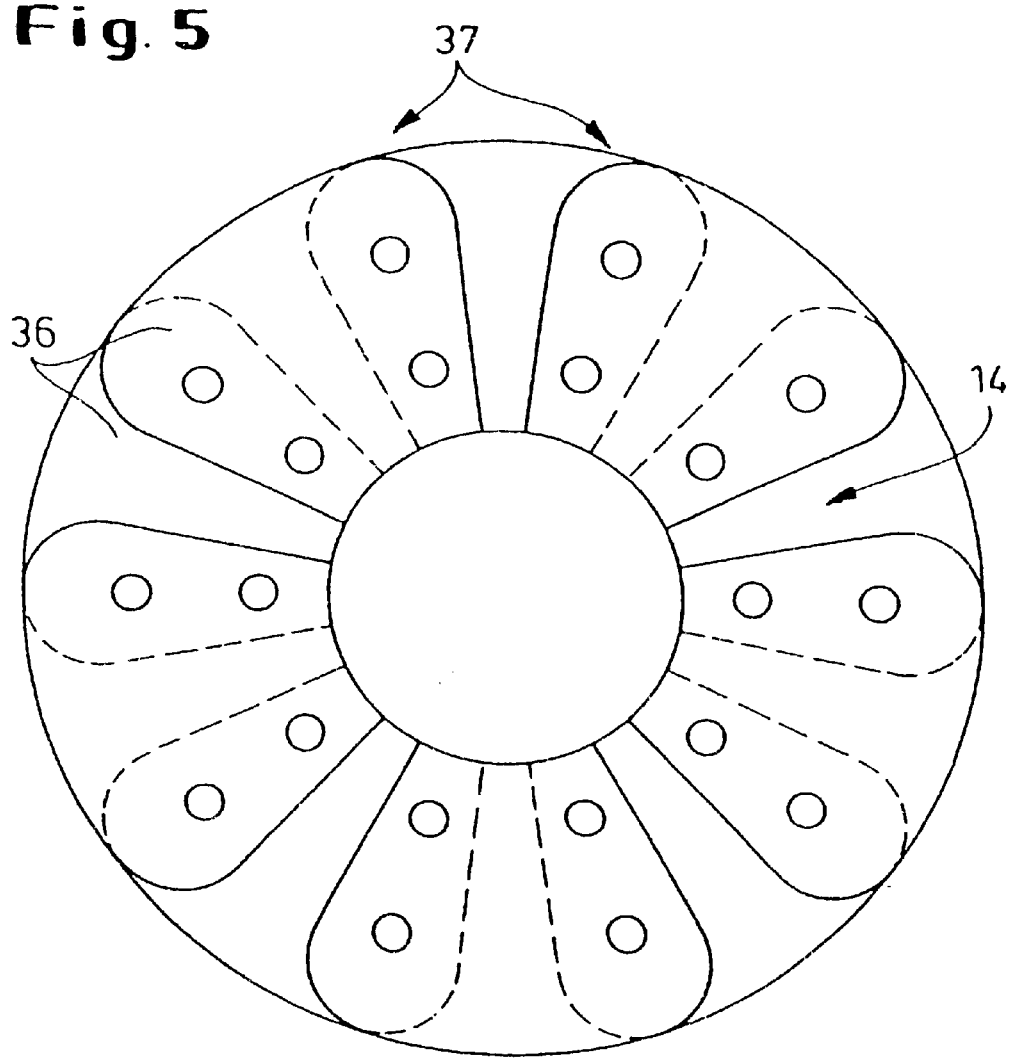

DEVICE AND METHOD FOR REMOVING VOLATILE COMPONENTS FROM POLYMER SOLUTIONS

FIELD OF THE INVENTION

This invention relates to a device and a process for the removal of volatile constituents from polymers, in particular for vaporising volatile components from polymer solutions by indirect heat exchange. The device has at least one container with an inlet for the polymer solution and outlet for the volatile components and an outflow for the polymer from which the volatile components have been removed, and a heat exchanger with a plurality of channels, which form a heat exchange zone, wherein the channels have a length of 1.0 to 40 cm, a height, constant over the length thereof, of 1.3 to 13 mm and a width of 1 to 10 cm in the entry zone of the channels and wherein the width of the channels at least doubles between the entry thereof and the exit thereof

BACKGROUND OF THE INVENTION

The removal of volatile components from a polymer solution is one of the final processing stages in the production of many polymers. The volatile constituents to be removed may be either solvents or unpolymerised monomers. Depending upon the viscosity of the polymer solution, various methods are known for the removal of the volatile components from polymer solutions, each involving heating the polymer solution by means of a heat exchanger to a temperature above the vaporisation temperature of the volatile constituents. Drying devices which are described are, for example, film evaporators, extruders and those with indirect heat exchange.

It is vital during heating of the polymer solution that the polymer is not thermally degraded.

Published patent application EP-A-150225 describes an apparatus having two heat exchange bundles connected in series. The heat exchange bundles have rectangular channels. This apparatus is primarily used for two-stage heating or cooling during the reaction, but is a relatively complex piece of equipment. EP-B-226204 discloses a process and a heat exchanger for the removal of volatile constituents from a polymer solution containing at least 25 wt. % of polymer. The polymer solution is heated in an indirect heat exchange zone, which consists of a plurality of channels. The channels have a substantially uniform ratio of surface area to volume in the range from 0.158 to 1.97 $mm^{-1}$, a height of 1.27 to 12.7 mm, a width of 2.54 to 10.16 cm and a length of 1.27 to 30.48 cm. The polymer solution is heated in the channels at a pressure of 2–200 bar to a temperature above the vaporisation temperature of the volatile components, but below the boiling temperature of the polymer. The residence time of the polymer solution in the channels is 5 to 120 seconds. After heating, the solution is transferred into a chamber in which at least 25% of the volatile constituents are stripped from the solution. The process reduces thermal damage by reducing the time for which the polymer is exposed to elevated temperatures. One disadvantage of the process is, however, that it is not possible to achieve complete removal of the solvent in a single stage. Moreover, polymer deposits form on the outside of the heat exchange bundle which carbonise over time and occasionally flake off, so contaminating the polymer from which the solvent has been removed.

EP-B-352 727 discloses a process for the removal of volatile constituents from polymer solutions by heating the polymer solution to above the vaporisation temperature of the volatile components in a plurality of channels connected in parallel. The ratio of heat exchange surface area to the volumetric flow rate of the product is ~80 $m^2/m^3/h$. The flow velocity in the channels is ~0.5 mm/s and the residence time of the polymer solution in the channels is 120 to 200 seconds. This process also has the disadvantage that complete removal of the solvent is not possible in a single stage. Moreover, polymer deposits form on the outside of the heat exchange bundle which carbonise over time and occasionally flake off, so contaminating the polymer from which the solvent has been removed.

The object thus arises of providing an apparatus and a process for the removal of volatile components from a polymer solution which do not exhibit the disadvantages of the prior art.

DETAILED DESCRIPTION OF THE INVENTION

The object is achieved by providing a device of the present invention for the removal of volatile components from a polymer solution comprising at least a container (30), which has an inlet (1) for the polymer solution, an outlet (3) for the volatile components and an outflow (2) for the polymer solution from which the volatile components have been removed, and a heat exchanger (31), which is arranged inside the container (30), with a central receiving zone (21) for the polymer solution, which is connected to the container inlet, a product zone (18) to receive the treated polymer solution, a heat exchange unit (31) having a plurality of channels (14), which form a heat exchange zone and which connect the receiving zone to the product zone (18), a heating means (13) to heat the heat exchange unit (31) and the channels, characterized in that the channels (14) have a length of 1.0 to 40 cm, a height, constant over the length thereof, of 1.3 to 13 mm and a width of 1 to 10 cm in the entry zone of the channels (14) in the receiving zone (21), wherein the width of the channels (14) at least doubles between the entry (23) thereof and exit (32) thereof to the product zone (18).

The present invention provides a device for the removal of volatile components from a polymer solution comprising at least one container, which has an inlet for the polymer solution, an outlet for the volatile components and an outflow for the polymer solution from which the volatile components have been removed, and a heat exchanger arranged inside the container which has a central receiving zone for the polymer solution, which is connected to the container inlet, a product zone to receive the treated polymer solution, a heat exchange unit having a plurality of channels, which form a heat exchange zone and which connect the receiving zone to the product zone, a heating means to heat the heat exchange unit and the channels, characterised in that the channels have a length of 1.0 to 40 cm, a height, constant over the length thereof, of 1.3 to 13 mm and a width of 1 to 10 cm in the entry zone of the channels in the receiving zone, wherein the width of the channels at least doubles between the entry thereof and the exit thereof to the product zone.

The channels preferably have a rectangular cross-section and the width of the channels at the outlet is three times as large as the width of the channels at the inlet, wherein the channels may widen continuously, but in accordance with any desired profile.

In a preferred embodiment, the channels widen parabolically.

A device in which the width of the channels is kept constant for at least half the length thereof and then widens to at least double the width, wherein the enlargement proceeds continuously, but in accordance with any desired, in particular non-linear, profile is likewise preferred. When an appropriately adjusted temperature is used, the channel shapes ensure that the width of the channel is constant in the zone in which the polymer solution is heated and does not enlarge until the polymer solution has reached a temperature of above the vaporisation temperature of the volatile components, such that these may readily be stripped out of the solution while still in the channels.

In one variant, both the width and the height of the channel may widen towards the exit in the preferred manner.

The heat exchanger of the device according to the invention preferably has at least 100 such channels. In particular, however, there are 200 to 100,000 channels in the heat exchanger.

In a preferred embodiment, the heat exchanger has a cylindrical shape, such that the channels surround the receiving zone in a cylindrical configuration. The heat exchanger is preferably arranged in the area of the channel outlets that the individual channels directly abut with each other laterally and/or at the upper and under side thereof, such that there are no zones between the channel exits on which the polymer material may be deposited. This applies to both the cylindrical and any other configuration of the channels.

In another preferred embodiment of the device, the heat exchange unit in particular has a cuboid shape and is arranged beneath the receiving zone.

In a preferred embodiment, the heat exchange unit is formed from a plurality of superposed or adjacent plate segments arranged in planes, wherein the plate segments are spaced apart in one plane, and wherein the spacing thereof and the lateral profile in the plane determine the width of the channels and the thickness of the plate segments determines the height of the channels.

In a preferred variant of the device, the heat exchange unit is formed from a plurality of superposed or adjacent plates arranged in planes, which plates are separated by spacers, wherein the spacing and lateral profile of the spacers determine the width of the channels and the thickness of the spacers determines the height of the channels.

The device is preferably entirely or in part, in particular those parts in contact with the polymer solution, made from a metallic material having a low iron content which contains at most 10 wt. %, preferably at most 5 wt. % of iron.

The material having a low iron content is preferably tantalum or a nickel alloy having a low iron content and is in particular selected from the range Alloy 59 (2.4605), Inconell 686 (2.4606), Alloy-B2, Alloy-B3, Alloy-B4, Hastelloy C-22, Hastelloy-C276, Hastelloy-C4, preferably Alloy 59.

The heat exchanger has any desired means known to the person skilled in the art for heating the channels to temperatures above the vaporisation temperature of the volatile components. These means are, for example, resistance heaters or a network of tubes to convey a heat exchange fluid.

The channels in the heat exchange unit are preferably inclined over the length thereof by a downwards angle relative to the horizontal towards the exit thereof, in particular, they are arranged vertically. In this case, the receiving zone is arranged above the channels.

The heating means for the heat exchanger preferably comprise a plurality of tubes which pass transversely relative to the channels through the plate segments or through the plates and through which a heat exchange fluid circulates.

The present invention also provides a process for the removal of volatile components from a polymer solution containing at least 40 wt. % of polymer using the device according to the invention, wherein the process comprises:

A) introduction of the polymer solution into the receiving zone at a pressure of 1 to 100 bar abs., B) passage and heating of the polymer solution in the channels of the heat exchanger to a temperature above the vaporisation temperature of the volatile components of the polymer solution and below the boiling or decomposition temperature of the polymer, wherein the residence time of the polymer solution in the channels is from 5 to 120 sec, C) separation of the volatile components from the polymer solution through the outlet and D) discharge of the polymer from which the volatile components have been removed.

The device and process according to the invention may be generally applied for the removal of volatile components from sensitive solids, in particular from thermoplastic polymers, elastomers, silicone polymers and high molecular weight lubricants and similar substances.

Preferably, however, the process according to the invention is used for degassing thermoplastic polymers. These polymers comprise any plastics which flow under the action of pressure and heat. Polystyrene, polycarbonate, polyphenylene, polyurethane, polyamide, polyester, polyacrylate, polymethacrylate may be mentioned by way of example in this connection. The process is very particularly suitable for degassing polycarbonate.

The volatile components may be both unpolymerised monomers and solvents. One solvent frequently used in the production of thermoplastic polymers is, for example, methylene chloride, or a mixture of methylene chloride and chlorobenzene.

The polymer solutions contain at least 40 wt. % of polymer. In the molten state, the polymer solution typically has a viscosity of 0.5 to 200 Pas.

In the process, the polymer solution is in particular compressed into the channels at a pressure of 1.5 to 50 bar abs., preferably of 2 to 5 bar abs., flows through the channels of the heat exchanger and is so heated to a temperature of preferably 250 to 350° C. The pressure prevailing at the outlet of the channels is preferably below the saturation pressure of the volatile components at the particular temperature. The pressure in the product zone is preferably less than or equal to $10^5$ Pa, in particular from 3000 Pa to $10^5$ Pa.

Preferably, the pressures upstream and downstream from the channels, the temperature in the channels and the shape of the channels are selected such that the volatile components are already completely separated from the polymer in the channels.

The pressure in the receiving zone and the temperature in the channels is in particular selected such that at least 95%, in particular at least 98%, preferably at least 99.5%, particularly preferably at least 99.8% of the volatile components of the polymer solution vaporise in the channels.

The residence time of the polymer solution in the channels is typically 5 to 120 sec, preferably 80 to 120 sec. The flow velocity of the polymer solution is in particular from 0.0001 to 0.01 mm/s, preferably from 0.001 to 0.005 mm/s. The ratio of heat exchange surface area of the channels to the volumetric flow rate of the polymer solution is 5 to 75, preferably 15 to 50 $m^2/m^3/h$.

BRIEF DESCRIPTION OF THE FIGURES

The following Figures illustrate the invention in greater detail. These illustrations are provided merely by way of example and thus do not limit the invention.

FIG. 5 shows a cross-section through one part of a variant of the heat exchanger of a device according to the invention comprising superposed plate segments.

EXAMPLES

Figure 1:
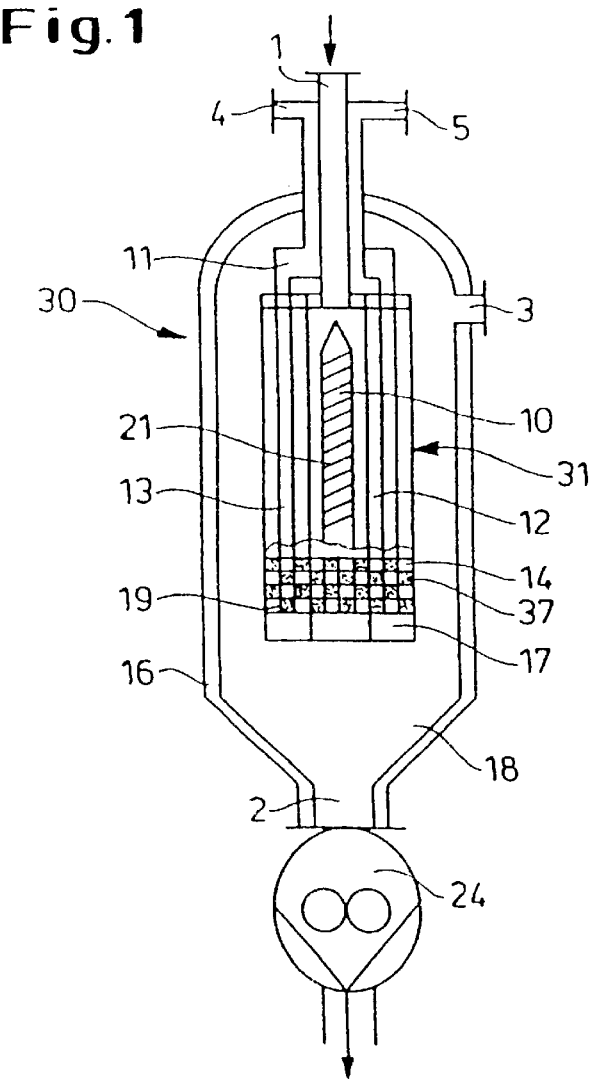
FIG. 1 shows a longitudinal section of an apparatus according to the invention.

The apparatus according to the invention is represented in FIG. 1. All units are made from Alloy 59 or have an Alloy 59 coating. The apparatus has a double shell 16. The upper part of the apparatus has an inlet 1 for the polymer solution and an outlet 3 for the volatile components. In the lower part, the polymer from which the volatile constituents have been removed is discharged through the outlet 2 with the assistance of pump 24. The temperature of the inlet 1 is controlled with a heat exchange medium.

Inside the double shell 16 is located the heat exchanger 31 with a central receiving zone 21 to receive the polymer solution to be degassed. The receiving zone 21 is connected to the inlet 1. 200 channels 14 (cf. FIG. 2) are arranged around the receiving zone 21, which channels extend from the receiving zone to the periphery of the heat exchanger 31 and which flare parabolically towards the exit 32 into the product zone 18.

The polymer solution is pumped through the inlet 1 into the receiving zone 21 using a conventional pump (not shown). In order to achieve a more uniform distribution of the polymer solution into the individual channels, a cylindrical displacement member 10 is located in the centre of the receiving zone 21. The heat exchanger furthermore has means to heat the channels to above the vaporisation temperature of the volatile components. These means are a plurality of tubes 13 on the periphery or within the heat exchanger 31, which are interconnected by the annular chamber 17. In the upper part, the tubes 13 are connected to the annular chamber 11, in which the hot heat exchange oil is introduced through line 4. The heat exchange oil is discharged from the heat exchanger through the line 5. The tubes 13 are held together by end plates. The shell 16 of the apparatus may be heated with a heat exchange fluid.

Figure 2:
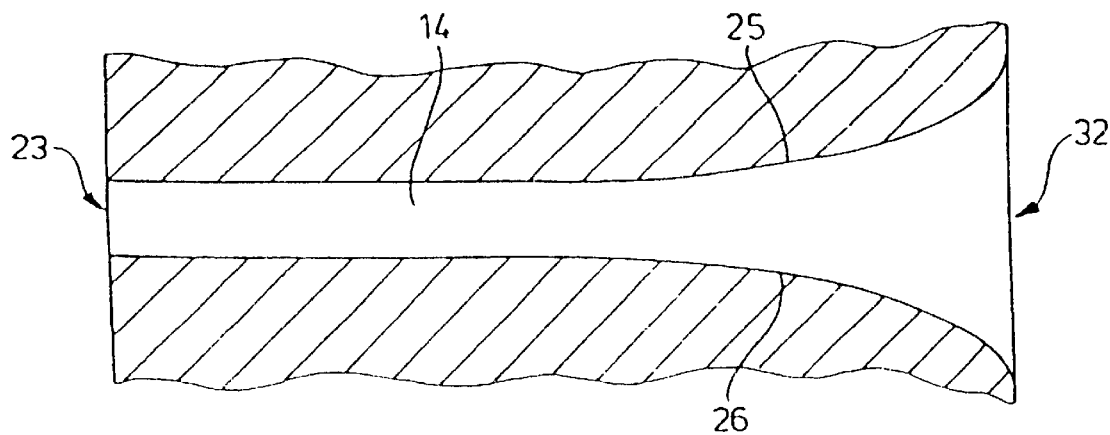
FIG. 2 shows a preferred arrangement of the channel width.

FIG. 2 is a schematic representation of a longitudinal section of a channel according to the invention of the device. The entry 23 has a rectangular cross-section with a height of 2 mm and a width of 10 mm. The length of the channel is 110 mm. The width of the channel is a constant 10 mm for the first 60 mm. Thereafter, the channel widens, such that the width thereof at the exit 32 is 40 mm. The downstream portion of the side walls 25 and 26 of the channel 14 is parabolic in shape.

Figure 3:
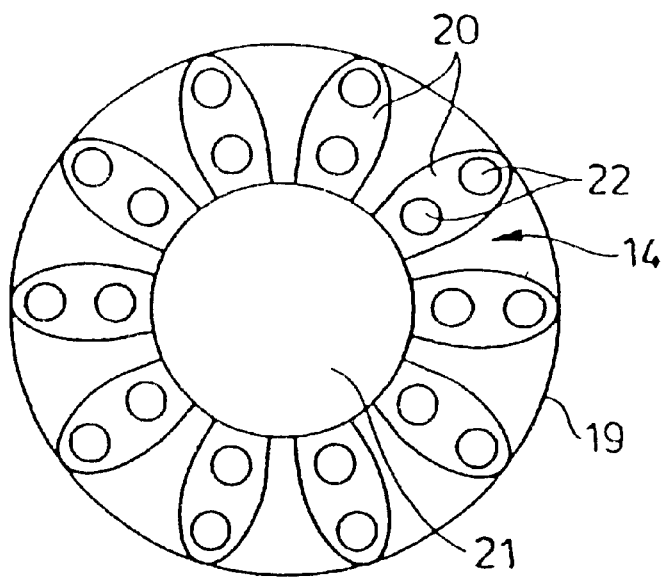
FIG. 3 shows a cross-section of one plane of the heat exchanger.

FIG. 3 shows how the channels 14 according to the invention are arranged in a circular configuration around the receiving zone 21. The tubes 13 run through the holes 22 in the spacers 20.

Figure 4:
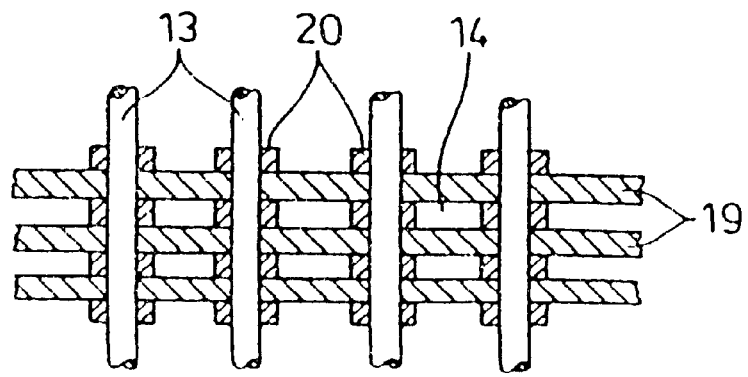
FIG. 4 shows in a longitudinal section through one part of a heat exchanger how the planes of the heat exchanger are superposed.

FIG. 4 shows a longitudinal section of several superposed channel planes. The channels 14 are formed by a plurality of alternately superposed spacers 20 and plates 19, through which the tubes 13 pass and hold the spacers and the plates in position. The arrangement shown here is suitable for a device having a vertical position of the channels 14. The receiving zone 21 in this case is located above the channel entries 23.

In the variant shown in FIG. 5, the heat exchange unit 31 is formed by layers 37 of superposed plate segments 36. The segments 36 are spaced apart by a layer 37 and so form the width of the channels 14. The height of the channels 14 is defined by the thickness of the plate segments 36.

The functioning of the apparatus according to the invention is further illustrated by means of FIG. 1. Once the polymer solution to be treated has been conveyed into the receiving zone 21, the solution passes into the channels 14, in which it is heated and the volatile components are removed therefrom. At the end 32 of the channels 14, the degassed polymer falls due to gravity into the product zone 18 of the shell 16 and is conveyed out of the apparatus according to the invention by means of pump 24 via line 2. The volatile components are drawn off through the outlet 3. The channels are heated by a heat exchange fluid, which circulates in the lines 4, 13 and 5.

Figure 7:
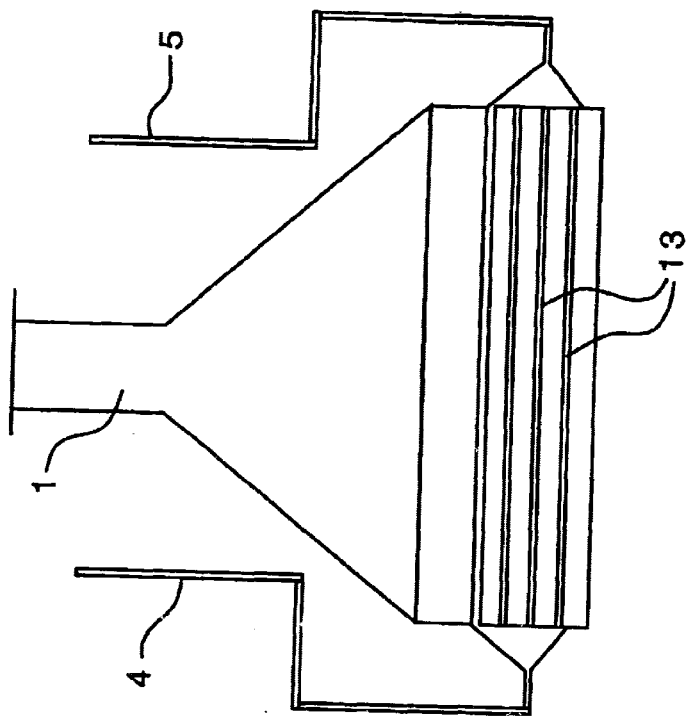
FIG. 7 shows a longitudinal section along line A—A in FIG. 6 in simplified form to clarify the passage of the heat exchange medium through the tubes 13.
Figure 6:
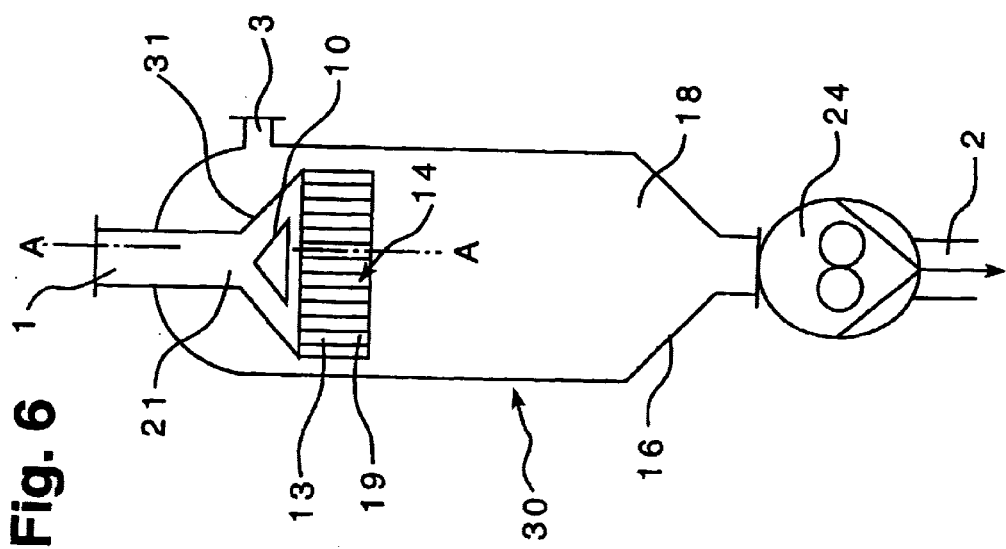
FIG. 6 shows a longitudinal section through a variant of the device according to the invention having vertically arranged channels.

In the variant of the device according to FIG. 6 (longitudinal section), vertically arranged layers of rectangular plates 19 and spacers 20 (cf FIG. 4) are held together by a bundle of tubes 13, the ends of which are connected by tube bends (not shown) and form a tubing system. The tubing system is connected to the inlet tube 4 and the outlet 5 for passage of a heat exchange oil (cf FIG. 7).

The polymer solution enters the device through the inlet 1 (FIG. 6), passes through the receiving zone 21 with the displacement member 10 and is distributed among the channels 14. In the channels 14, the solution flows downwards and the volatile constituents are removed by heating. The polymer melt leaves the channels 14 and drips into the product zone 18 for further processing. The polymer is discharged by means of the pump 24 through the line 2.

Test Example

In this Example, a 75 wt. % polycarbonate solution containing 24 wt. % of chlorobenzene and 1 wt. % of methylene chloride was concentrated in an apparatus as shown in FIG. 1. The polycarbonate solution was compressed into the channels 14 at a pressure of 3000 hPa and heated therein to 300° C. A pressure of 40 hPa prevailed in the product zone downstream from the channels. The residence time of the polymer in the channels 14 was 100 seconds. The channels were 1 cm wide at the entry 23 and 3 cm wide at the exit 32 and, after half the channel length, flare out as shown in FIG. 2. All parts in contact with the product were made from Alloy 59. The pressures at the entry 23 and exit 32 of the channels 14 and the shape of the channels were selected such that the volatile components have already completely or at least virtually completely been removed in the channels. The degassed polycarbonate exhibited a residual chlorobenzene content (solvent) of only 400 ppm.

What is claimed is:

1. In a device for removing volatile components from a polymer solution comprising a container comprising:

(i) an inlet for the polymer solution;

(ii) an outlet for the volatile components;

(iii) an outflow for the polymer solution from which the volatile components have been removed;

(iv) a heat exchange unit arranged inside the container with a central receiving zone for the polymer solution, the central receiving zone connected to the container inlet; and (v) a product zone to receive the polymer solution from which the volatile components have been removed, wherein the heat exchange unit has a plurality of channels forming a heat exchange zone and connecting the central receiving zone to the product zone, the improvement comprising including a heating means to heat the heat exchange unit and the channels, wherein the channels have a length of 1.0 to 40 cm, a height, constant over the length thereof, of 1.3 to 13 mm and a width of 1 to 10 cm at entry of the channels and wherein the width of the channels at least triples between the entry and the exit thereof to the product zone.

2. In a device for removing volatile components from a polymer solution comprising a container comprising:

(i) an inlet for the polymer solution;

(ii) an outlet for the volatile components;

(iii) an outflow for the polymer solution from which the volatile components have been removed;

(iv) a heat exchange unit arranged inside the container with a central receiving zone for the polymer solution, the central receiving zone connected to the container inlet; and (v) a product zone to receive the polymer solution from which the volatile components have been removed, wherein the heat exchange unit has a plurality of channels forming a heat exchange zone and connecting the central receiving zone to the product zone, the improvement comprising including a heating means to heat the heat exchange unit and the channels, wherein the channels have a length of 1.0 to 40 cm, a height, constant over the length thereof, of 1.3 to 13 mm and a width of 1 to 10 cm at entry of the channels and wherein the width of the channels is constant between the entry and at least half the length thereof and at least doubles over the remainder of the length thereof to the exit to the product zone.

3. In a device for removing volatile components from a polymer solution comprising a container comprising:

(i) an inlet for the polymer solution;

(ii) an outlet for the volatile components;

(iii) an outflow for the polymer solution from which the volatile components have been removed;

(iv) a heat exchange unit arranged inside the container with a central receiving zone for the polymer solution, the central receiving zone connected to the container inlet; and (v) a product zone to receive the polymer solution from which the volatile components have been removed, wherein the heat exchange unit has a plurality of channels forming a heat exchange zone and connecting the central receiving zone to the product zone, the improvement comprising including a heating means to heat the heat exchange unit and the channels, wherein the channels have a length of 1.0 to 40 cm, a height, constant over the length thereof, of 1.3 to 13 mm and a width of 1 to 10 cm at entry of the channels and wherein the width of the channels increases non-linearly between the entry and exit thereof to the product zone.

4. The device according to claim 3, wherein the width of the channels increases parabolically.

5. The device according to any one of claims 1–3, wherein the heat exchange unit comprises more than 100 channels.

6. The device according to any one of claims 1–3, wherein the heat exchange unit has a cylindrical shape and surrounds the receiving zone.

7. The device according to any one of claims 1–3, wherein the heat exchange unit has a cuboid shape and is arranged beneath the receiving zone.

8. The device according to any one of claims 1–3, wherein the heat exchange unit is formed from a plurality of superposed or adjacent plate segments arranged in planes, wherein the plate segments are spaced apart in one plane and wherein the spacing thereof and the lateral profile in the plane determine the width of the channels and the thickness of the plate segments determines the height of the channels.

9. The device according to any one of claims 1–3 wherein the heat exchange unit is formed from a plurality of superposed or adjacent plates arranged in planes, which plates are separated by spacers, wherein the spacing and lateral profile of the spacers determine the width of the channels and the thickness of the spacers determines the height of the channels.

10. The device according to any one of claims 1–3, wherein the channels in the heat exchange unit are inclined over the length thereof by a downwards angle relative to the horizontal towards the exit thereof.

11. The device according to any one of claims 1–3, wherein the heating means comprises a plurality of tubes which pass transversely relative to the channels through plates or plate segments and through which a heat exchange liquid circulates.

12. The device according to any one of claims 1–3, wherein the device at least partially comprises a metallic material containing at most 10 wt. % of iron.

13. The device according to claim 12, wherein the metallic material is tantalum or a nickel alloy having a low iron content and is selected from the group consisting of Alloy 59 (2.4605), Inconell 686 (2.4606), Alloy-B2, Alloy-B3, Alloy-B4, Hastelloy C-22, Hastelloy-C276 and Hastelloy-C4.

14. The device according to claim 12, wherein the metallic material comprises Alloy 59.

15. A process for the removal of volatile components from a polymer solution containing at least 40 wt. % polymer comprising:

(a) providing a device for removing volatile components from said polymer solution comprising a container comprising, (i) an inlet for the polymer solution, (ii) an outlet for the volatile components, (iii) an outflow for the polymer solution from which the volatile components have been removed, (iv) a heat exchange unit arranged inside the container with a central receiving zone for the polymer solution, the central receiving zone connected to the container inlet, and (v) a product zone to receive the polymer solution from which the volatile components have been removed, wherein the heat exchange unit has a plurality of channels forming a heat exchange zone and connecting the central receiving zone to the product zone, the improvement of said device comprising including a heating means to heat the heat exchange unit and the channels, wherein the channels have a length of 1.0 to 40 cm, a height, constant over the length thereof, of 1.3 to 13 mm and a width of 1 to 10 cm at entry of the channels, and wherein one of, (I) the width of the channels at least triples between the entry and the exit thereof to the product zone, (II) the width of the channels is constant between the entry and at least half the length thereof and at least doubles over the remainder of the length thereof to the exit to the product zone, and (III) the width of the channels increases non-linearly between the entry and exit thereof to the product zone;

(b) introducing the polymer solution into the central receiving zone at a pressure of 1 to 100 bar abs.;

(c) passing and heating the polymer solution in the channels of the heat exchanger to a temperature above the vaporization temperature of the volatile components of the polymer solution and below the boiling or decomposition temperature of the polymer, wherein the residence time of the polymer solution in the channels is from 5 to 120 seconds;

(d) separating the volatile components from the polymer solution through the outlet; and (e) discharging the polymer from which the volatile components have been removed.

16. The process according to claim 15, wherein the polymer is a thermoplastic polymer selected from the group consisting of polystyrene, polyphenylene, polyurethane, polyamide, polyester, polyacrylate, polymethacrylate, polycarbonate, a copolymer of the stated polymers and an elastomer or a silicone polymer.

17. The process according to claim 15, wherein the volatile component is a polymer solvent or a monomer of the polymer.

18. The process according to claim 15, wherein the pressure in the receiving zone and the temperature in the channels are selected such that at least 95% of the volatile components of the polymer solution vaporize in the channels.

19. The process according to claim 18, wherein the pressure and temperature are selected such that at least 98% of the volatile components of the polymer solution vaporize in the channel.

20. The process according to claim 18, wherein the pressure and temperature are selected such that at least 99.5% of the volatile components of the polymer solution vaporize in the channel.

21. The process according to claim 15, wherein the temperature in the channels is 250 to 350° C.

22. The process according to claim 15, wherein the pressure in the receiving zone at the entry to the channels is from 1.5 to 50 bar abs.

23. The process according to claim 15, wherein the pressure in the product zone is less than or equal to $10^5$ Pa.

24. The process according to claim 15, wherein the pressure in the receiving zone at the entry to the channels is from 2–5 bar abs.

25. The process according to claim 15, wherein the pressure in the product zone is from 3000 to $10^5$ Pa.

* * * * *